United States Patent [19]

Stankwitz et al.

[11] Patent Number: 5,686,922
[45] Date of Patent: Nov. 11, 1997

[54] SUPER SPATIALLY VARIANT APODIZATION (SUPER - SVA)

[75] Inventors: Herbert C. Stankwitz; Michael R. Kosek, both of Ann Arbor, Mich.

[73] Assignee: Environmental Research Institute of Michigan, Ann Arbor, Mich.

[21] Appl. No.: 692,573

[22] Filed: Aug. 6, 1996

Related U.S. Application Data

[60] Provisional application No. 60/005,450, Sep. 29, 1995.

[51] Int. Cl.$^6$ .......................................... G01S 13/00
[52] U.S. Cl. ...................... 342/196; 342/195; 342/379; 364/576; 324/76.21
[58] Field of Search ....................... 342/195, 196, 342/379; 364/576; 324/76.21

[56] References Cited

U.S. PATENT DOCUMENTS

| | | | |
|---|---|---|---|
| 4,797,923 | 1/1989 | Clarke | 364/576 |
| 5,122,732 | 6/1992 | Engeler et al. | 342/14 |
| 5,349,359 | 9/1994 | Dallaire et al. | 342/195 |
| 5,361,072 | 11/1994 | Barrick et al. | 342/133 |

*Primary Examiner*—Theodore M. Blum
*Attorney, Agent, or Firm*—Gifford,Krass, Groh,Sprinkle,Patmore,Anderson & Citkowski

[57] ABSTRACT

In systems wherein signal compression is performed using matched filters or transforms, as in the case of radar, multiple extrapolations are used to resolve beyond the limits of defraction. In one example, development of the method begins with a complex, uniformly weighted SAR or inverse SAR signal represented by a rectangle function. After performing an FFT, adaptive sidelobe reduction is carried out followed by an inverse weighting and truncation, after which the original signal is used to replace the center portion of the extrapolated signal. The signal is again transformed and sidelobe reduced, and inverse weighting and truncation are again performed, followed by the original data replacement step. The extrapolation procedure may be repeated end times, extrapolating each time by a factor K for a total extrapolation factor of $K=k^n$.

21 Claims, 8 Drawing Sheets

Signal Domain Response of Two Points
+ Original Image
-- 2X Super-SVA Image with Post-SVA
- Twice Bandwidth Original Signal Image Domain Response of Two Points
+ Original Image
-- 2X Super-SVA Image with Post-SVA
··· Twice Bandwidth Original Image with SVA

SUPER SPATIALLY VARIANT APODIZATION (SUPER - SVA)

This application is related to provisional application Ser. No. 60/005,450 (Sep. 29, 1995).

FIELD OF THE INVENTION

This present invention relates to improvements in resolution beyond the limits of defraction (super-resolution) for coherent narrow band signals when performing signal compression using matched filters or transforms. The instant invention is based on unique properties of spatially variant apodization applied to compressed coherent narrow band signal data as set forth in U.S. Pat. No. 5,349,359, much of which has been incorporated herein to provide an environment for the instant invention.

BACKGROUND OF THE INVENTION

Signal compression is a common operation which is performed in many systems, including radar. The compression is often performed as a transform of domain, such as from the time domain to the frequency domain. The accuracy of the compression is limited by the finite amount of signal that can be collected. In the case of imaging radars, a signal consists of one or more sine waves in time that must be transformed into the spatial domain in order to determine their frequency, magnitude, and sometimes phase. The most common method for transformation is the Fourier transform.

The Fourier transform of a limited duration sine wave produces a waveform that can be described by a sinc function (FIG. 1). The sinc function has a mainlobe which contains the peak and has a width up to the first zero crossing, and a set of sidelobes comprising the oscillating remainder on both sides of the mainlobe. In radar and some other fields, the composite function of the mainlobe and the sidelobes is termed the impulse response (IPR) of the system. The location of the center of sinc function is related to the frequency of the sine wave. If there are more than one sine wave present in the signal being analyzed they will appear in the output at other locations. The resolution is related to the width of the mainlobe. The presence of sidelobes reduces the ability to discriminate between sinc functions.

Traditionally, the sidelobes of the impulse response have been reduced by multiplying the signal prior to compression by an amplitude function that is a maximum at the center and tending toward zero at the edges, as typified by a Hanning weighing function show in FIG. 2. Sidelobe reduction by amplitude multiplication is called "weighting" or, sometimes, "apodization". Unfortunately, employing that kind of apodization to reduce sidelobes also results in the broadening of the mainlobe which degrades the resolution of the system.

One family of apodization functions is termed "cosine-on-pedestal". Hanning (50% cosine and 50% pedestal, as shown in FIG. 2) and Hamming (54% cosine and 46% pedestal) are two of the most popular. Hanning weighting reduces the peak sidelobe from −13 dB of the mainlobe's peak to −32 dB but it also doubles the mainlobe width (FIG. 3).

The equivalent of apodization can also be performed in the output domain by convolution. In the case of digitally sampled data, convolution is performed by executing the following operation on each point in the sequence: multiply each sample by a real-valued weight which is dependent on the distance from the point being processed.

Any of the cosine-on-pedestal family of apodizations is especially easy to implement by convolution when the transform is of the same length as the data set, i.e., the data set is not padded with zeroes before transformation. In this case, the convolution weights are non-zero only for the sample itself and its two adjacent neighbors. The values of the weights vary from [0.5, 1.0, 0.5] in the case of Hanning to [0.0, 1.0, 0.0] in the case of no apodization. Different cosine-on-pedestal apodization functions have different zero crossing locations for the sidelobes. The Hanning function puts the first zero crossing at the location of the second zero crossing of the unweighted impulse response. Not shown in FIGS. 1 and 3, the signs of the IPRs are opposite for all sidelobes when comparing unapodized and Hanning apodized signals.

To improve the process, a method called dual-apodization has been developed. In this method, the output signal is computed twice, once using no apodization and a second time using some other apodization which produces low sidelobes. Everywhere in the output, the two values are compared. The final output is always the lesser of the two. In this way the optimum mainlobe width is maintained while the sidelobes are generally lowered. An extension to dual apodization is multi-apodization. In this method, a number of apodized outputs are prepared using a series of different apodizations, each of which have zero-crossings at different locations. The final output is the least among the ensemble of output apodized values at each output point. In the limit of an infinite number of apodizations, all sidelobes will be eliminated while the ideal mainlobe is preserved.

Another method was discovered that could compute, for each sample in a sidelobe region, which of the cosine-on-pedestal functions provided the zero crossing from among the potentially infinite number of possible apodizations. This method is called spatially variant apodization (SVA). This method computes the optimum convolution weight set for each sample using a simple formula based on the value of the sample and two of its neighbors. Under noise free conditions, well separated compressed signals show only the mainlobes, and all sidelobes are removed. Under the usual noisy conditions, the output signal to background ratios are improved and the sidelobes are greatly reduced.

A final technique embodied in this invention was developed when a method was discovered that, while relatively efficient computationally with minimum added noise and artifacts, improved image resolution beyond the limits of diffraction (super-resolution). The technique is signal extrapolation through a super-resolution algorithm for SAR/ISAR imagery based on SVA which does not require any a-priori knowledge of scene content, object support, or point scatterer modeling. This technique is called Super-SVA. The technique is used after forming the complex image in conjunction with SVA. The final super-resolved complex image is then magnitude detected and displayed. Using the technique, improved RCS discrimination results for closely spaced scatterers, with the possibility of making wideband RCS determinations from relatively narrowband signals. This algorithm also has other potentially important applications in areas such as spectral estimation and data compression.

SUMMARY OF THE INVENTION

When a signal of finite duration undergoes a signal compression via a transform, such as a Fourier transform, sidelobes develop that obscure details in the output data. This invention is a method for attenuating or eliminating the sidelobes without compromising the resolution of the signal. The usual step is a compression of the signal using little or no apodization. The second step is to determine the convolution weights for each output sample. The center weight is unity. The outer two are the same and are computed as follows: 1) the two adjacent samples are summed, 2) the sum is divided into the value of the center sample, and 3) the resulting value is limited to a specific range depending on the application, e.g. 0 to 0.5. In the final step, the sample is convolved using the computed weight set.

This method has variants depending on the type of compression, the type of signal, and the application. Fourier transforms are a standard method of compressing sine waves but other transforms are also used, including cosine, Hartley and Haddamard. Matched filter compression is also used in the cases in which the signal is not a sine wave but some other expected waveform. In each compression method, one must search for the convolution set that implements a set of apodizations which affect the magnitudes and signs of the sidelobes.

The type of signal can be real or complex, one dimensional or multidimensional. For real-valued functions, there is only one channel to process. Complexed-valued functions have an in-phase (I) channel and a quadrature (Q) channel. Spatially variant apodization can be applied to the I and Q channels independently or can, with a slight modification in the equation, handle the joint I/Q pair.

When the signals are two (or higher) dimensional, there are again several ways to perform the spatially variant apodization. The first is to apodize in one dimension at a time in a serial manner. The second is to apodize each dimension, starting from the same unapodized process. The results of apodizing in the individual dimensions are combined by taking the minimum output among the individual apodizations for each output sample.

After the formation of the complex image in conjunction with SVA, the technique of Super-SVA is utilized with the object of improving image resolution, with the super-resolved image being then magnitude detected and displayed.

In summary, the family of spatially variant apodization methods select a different and optimum apodization at each output position in order to minimize the sidelobes arising from signal compressions of finite data while Super-SVA extrapolates the signal bandwidth for an arbitrary scatterer by a factor of two or more, with commensurate improvement in resolution.

DETAILED DESCRIPTION OF THE INVENTION

Spatially variant apodization (SVA) allows each pixel in an image to receive its own frequency domain aperture amplitude weighting function from an infinity of possible weighting functions. In the case of synthetic aperture radar (SAR), for example, SVA effectively eliminates finite-aperture induced sidelobes from uniformly weighted data while retaining nearly all of the good mainlobe resolution and clutter texture of the unweighted SAR image.

Figure 1:
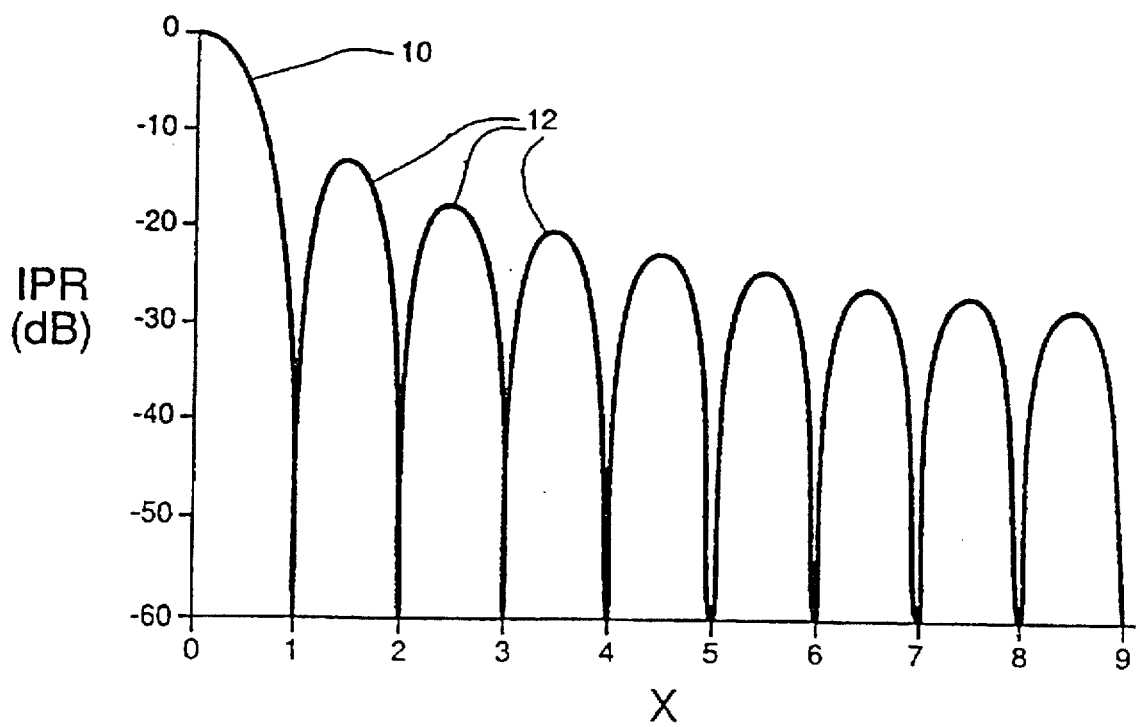
FIG. 1 depicts the impulse response of performing a Fourier transform on a finite-aperture image.
Figure 2:
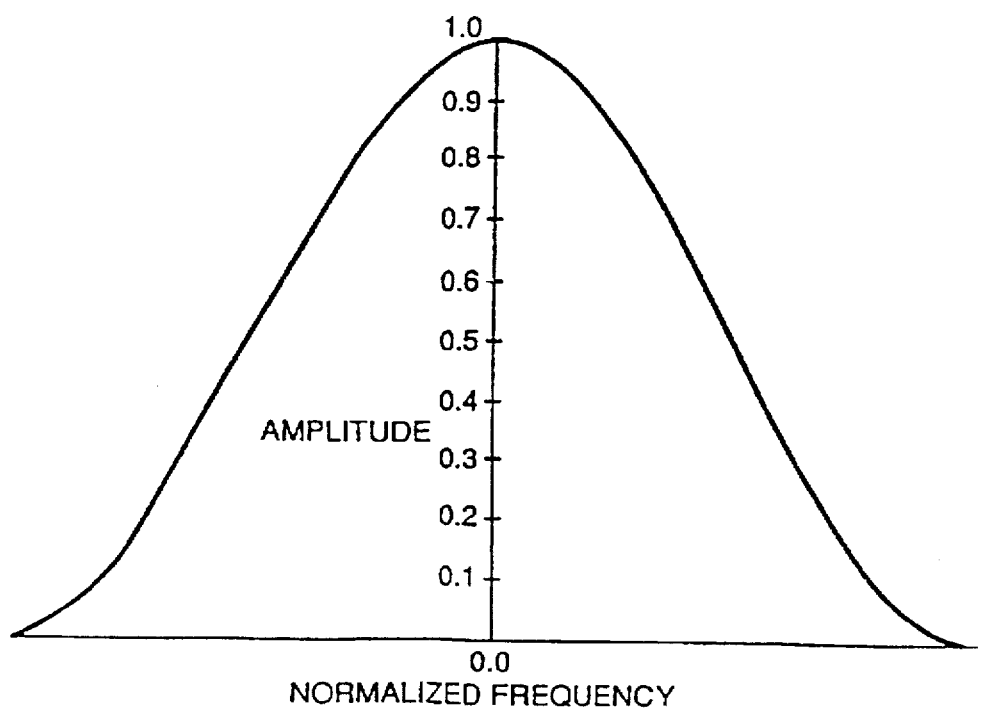
FIG. 2 depicts a Hanning weighting function.
Figure 3:
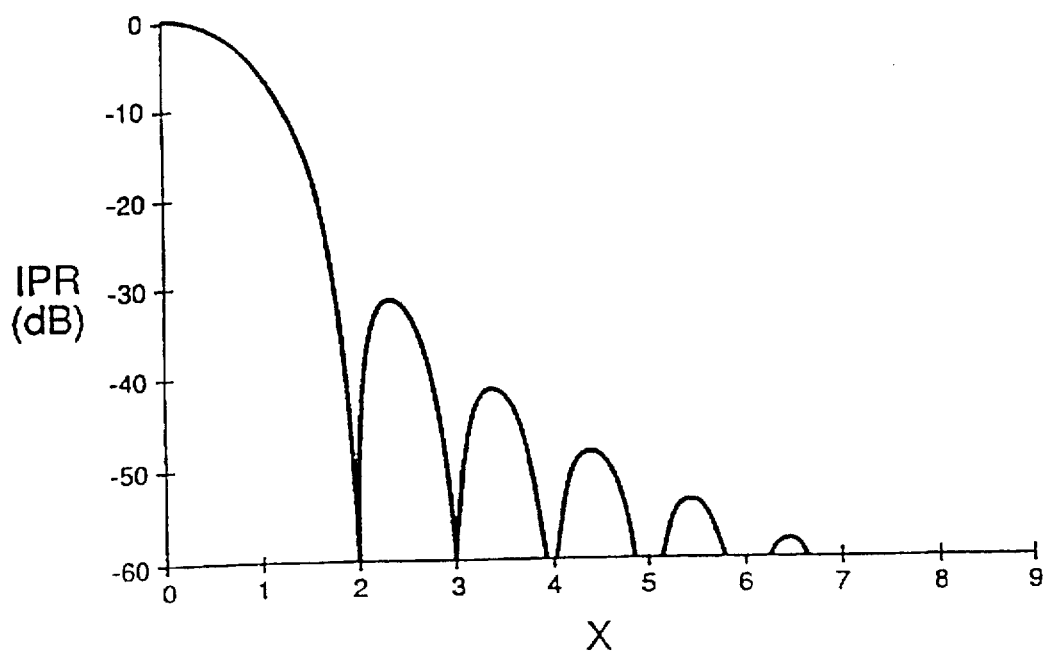
FIG. 3 depicts the impulse response when Hanning weighting function is applied.

FIG. 1 depicts the graph of a sinc function waveform. This serves to model the impulse response of performing a Fourier transform on a set of finite-aperture data. The mainlobe 10 carries the information from the original signal. To maintain the resolution of the image, the mainlobe 10 must not be widened during the apodization of the image. The sidelobes 12 do not carry any information about the original signal. Instead, they serve to obscure the neighboring details which have weaker signal strengths than the sidelobes.

Figure 4:
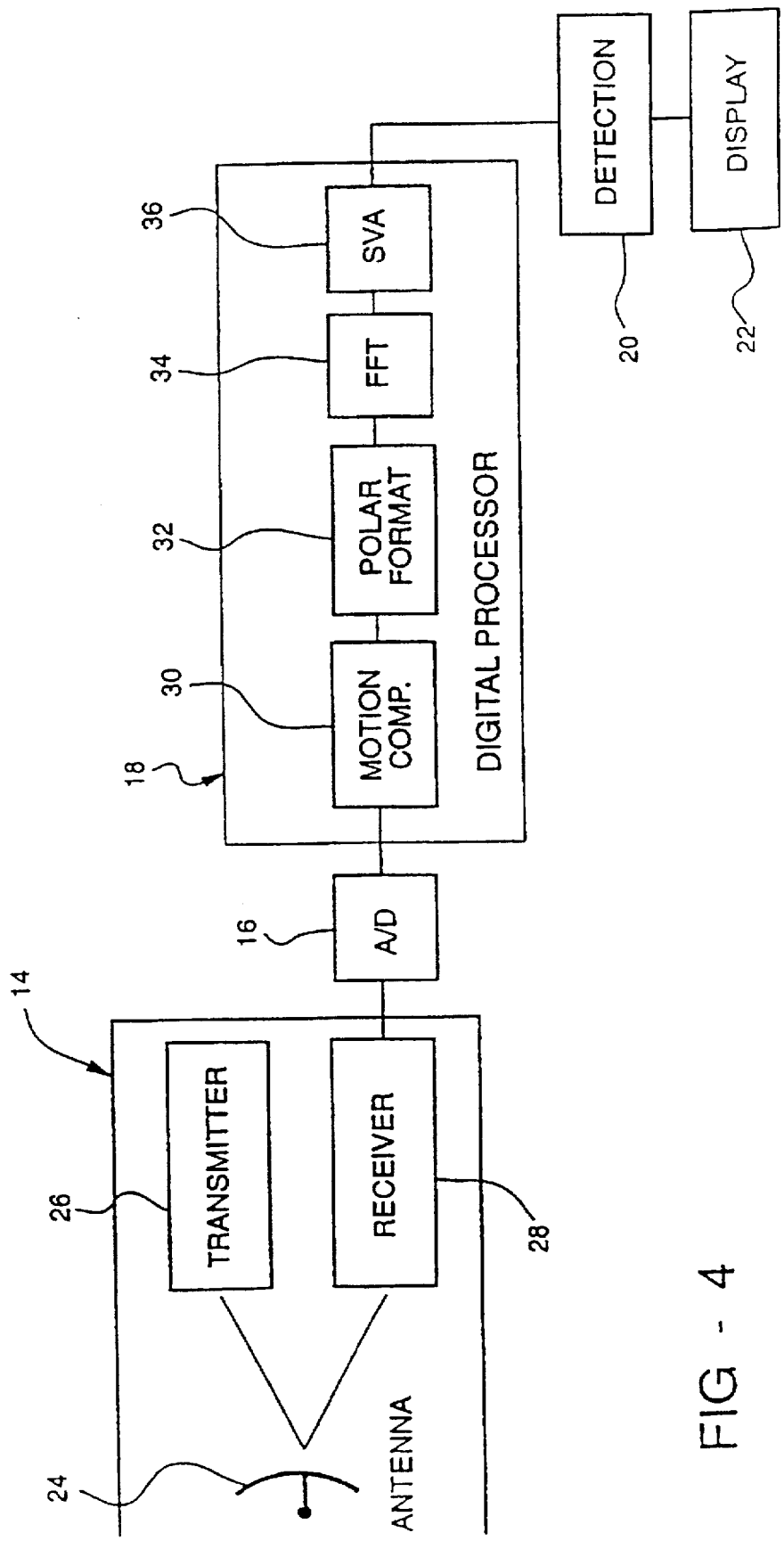
FIG. 4 is a block diagram of a synthetic aperture radar system employing spatially variant apodization.

Spatially variant apodization was developed for synthetic aperture radar in response to the problems inherent to finite aperture systems as described above. However, there are many different embodiments for spatially variant apodization in areas of imagery, digital signal processing, and others. FIG. 4 is a simplified block diagram of a synthetic aperture radar system utilizing spatially variant apodization. The system can be broken into five smaller sections: data acquisition 14, data digitizing 16, digital image formation processing 18, detection 20 and display 22.

Data acquisition 14 for synthetic aperture radar comprises a transmitter 26 to generate a radio frequency signal to be broadcast by an antenna 24. The reflected radio signals returning to the antenna 24 are sent to the receiver, where a complex pair of signals are formed and sent to an analog to digital converter 16.

The analog to digital converter 16 samples and digitizes each signal and passes the data to the digital processor 18. In the digital processor 18, the first function performed is that of motion compensation 30. Since this type of system is used in moving aircraft to survey surface features, the motion of the plane must be taken into consideration so that the image is not distorted. After motion compensation 30, the signals are processed by polar formatting circuitry or algorithms 32 to format the data in such a manner so that a coherent two dimensional image can be formed by a Fourier transform. The next step in digital processing is to transform the data from the frequency domain to the space domain via a Fast Fourier Transform (FFT) 34. It is at this step that sidelobes are produced in the image. The final step in the digital processor 18, is to perform spatially variant apodization 36 on the complex data sets.

Following the digital processing 18, detection 20 takes place to form the final signal which drives the display 22. Detection 20 comprises determining the magnitude of the complex image. From this data a two dimensional image can be displayed on a CRT or on film.

It is well known from "On the Use of Windows for Harmonic Analysis With the Discrete Fourier Transform," Proceedings of the IEEE, Vol. 66, No. 1, January 1978, that cosine-on-pedestal frequency domain weighting functions can be implemented using a 3-point convolver on complex, Nyquist sampled imagery. The cosine-on-pedestal weighting functions are given by $$A(n) = 1 + 2w \cos\left(\frac{2\pi n}{N}\right). \quad (1)$$

This family of weightings range from uniform weighting (w=0: all pedestal, no cosine) to Hanning weighting (w=0.5: all cosine, no pedestal). Hamming weighting is a special case of cosine-on-pedestal which nulls the first sidelobe (w=0.43). Similarly, any unweighted aperture sinc-function sidelobe can be suppressed using one of the family of cosine-on-pedestal weighting functions.

Taking the length-N discrete Fourier transform of a cosine-on-pedestal weighting function yields the Nyquist-sampled IPR:

$$a(m) = w\delta_{m,-1}\delta_{m,0}w\delta_{m,1} \quad (2)$$

where $\delta_{m,n}$ is the Kronecker delta function, $$\delta_{m,n} = \begin{cases} 1, & m=n \quad (a) \\ 0, & m \neq n \quad (b) \end{cases} \quad (3)$$

The fact that this IPR contains only three nonzero points allows the imposition of any of this family of weighting functions to be efficiently performed by convolution in the image domain by the three-point kernel given in Eq. (2).

Letting g(m) be the samples of either the real (I) or imaginary (Q) component of a uniformly weighted Nyquist-sampled image. Using the 3-point convolver given in Eq. (2) to achieve a given cosine-on-pedestal aperture weighting, g(m) is replaced by g'(m) as follows:

$$g'(m) = w(m)g(m-1) + g(m) + w(m)g(m+1). \quad (4)$$

As w(m) varies from 0 to ½, the frequency domain amplitude weighting varies from cosine-on-zero pedestal (Hanning) at w(m)=½ to uniform weighting at w(m)=0. The center convolver weight is always unity in order to normalize the peaks of the point-target responses for the family of cosine-on-pedestal weightings.

The task is to find the w(m) which minimizes $|g'(m)|^2$ subject to the constraints $0 \leq w(m) \leq \frac{1}{2}$. The unconstrained w(m) that gives the minimum is obtained by setting equal to zero the partial derivative of $|g'(m)|^2$ with respect to w(m), and solving for w(m):

$$w_u(m) = \frac{-g(m)}{g(m-1) + g(m+1)}. \quad (5)$$

This can also be obtained directly by solving for g'(m)=0.

If $w_u(m)$ in Eq. (5) is inserted into Eq. (4), then we get g'(m)=0. Constraining $w_u(m)$ in Eq. (5) to lie in the interval [0, ½], and inserting it into Eq. (4) yields the output image;

$$g'(m) = \begin{cases} g(m), & w_u(m) < 0 \quad (a) \\ 0, & 0 \leq w_u(m) \leq 1/2 \quad (b) \\ g(m) + (1/2)[g(m-1) + g(m+1)], & w_u(m) > 1/2 \quad (c) \end{cases} \quad (6)$$

Therefore, whenever $0 \leq w_u(m) \leq \frac{1}{2}$, we have g'(m)=0; but g'(m) can be nonzero wherever $w_u(m)<0$ or $w_u(m)>\frac{1}{2}$. Eq. (11) is performed on the I and Q values independently. The result is a minimization of the $I^2$ and $Q^2$ pixel values independently for an infinite but bounded set of frequency-domain weighting functions chosen from the cosine-on-pedestal family.

Now, defining y as the average of the two nearest neighbors to g(m), i.e.

$$y = (\frac{1}{2})[g(m-1) + g(m+1)], \quad (7)$$

then, Equations 6(a-c) can be rewritten as:

If $g(m)y \geq 0$, then g'(m)=g(m); (a) else if $|g(m)|<|y|$, then g'(m)=0;
(b) otherwise g'(m)=g(m)+y. (c) $\quad (8)$ Here the fact that $g(m)y \geq 0$ implies that g(m) and y have the same sign. Eqs. (7) and (8) represent a compact, efficient implementation of SVA. This implementation is denoted "I-Q Separately SVA" (SVA-S) as set forth in "Nonlinear Apodization for Sidelobe Control in SAR Imagery," IEEE Transaction on Aerospace and Electronic Systems, Vol. 31, No. 1, January 1995. Another version derived therein is "I-Q Jointly SVA" (SVA-J) where the minimization leading to Eq. (5) is based on minimizing the squared magnitude ($I^2+Q^2$) of each pixel. Various methods for applying SVA in two dimensions are also discussed in the above-mentioned paper.

Figure 5:
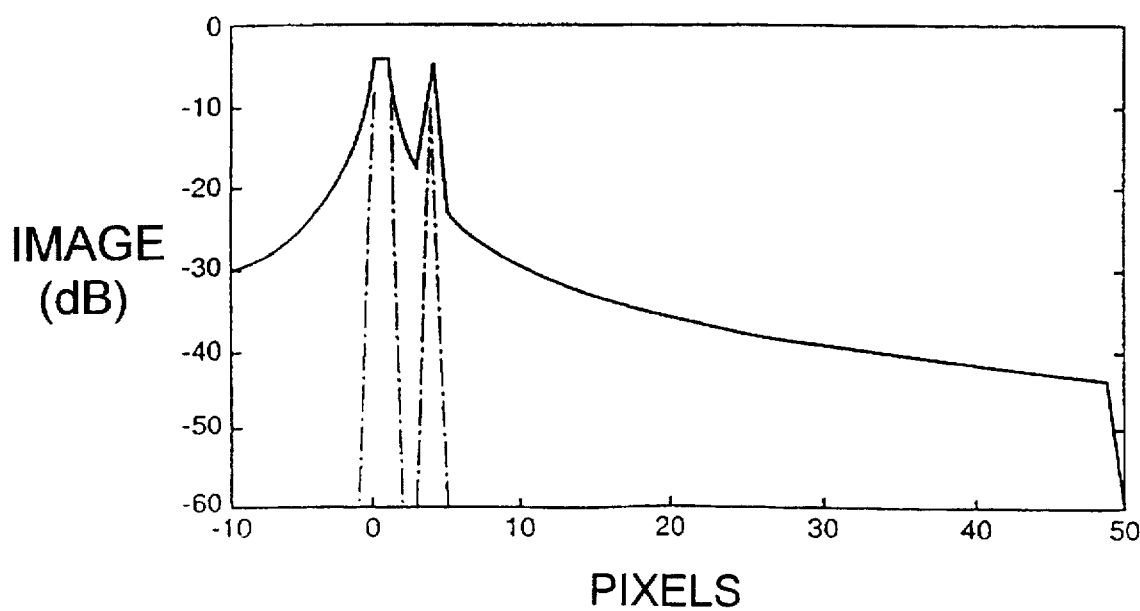
FIG. 5 illustrates the effect of the SVA algorithm on a data set having two peaks.

FIG. 5 illustrates the effect of the SVA algorithm on a data set having two peaks. The solid line is the sum of two sincs separated by 3.5 samples. The output of the SVA algorithm is shown in the dashed line which reveals the two distinct peaks with no sidelobes and not broadening of the main-lobes. The same result was reached using either the independent treatment of I and Q, or the joint treatment.

Figure 6:
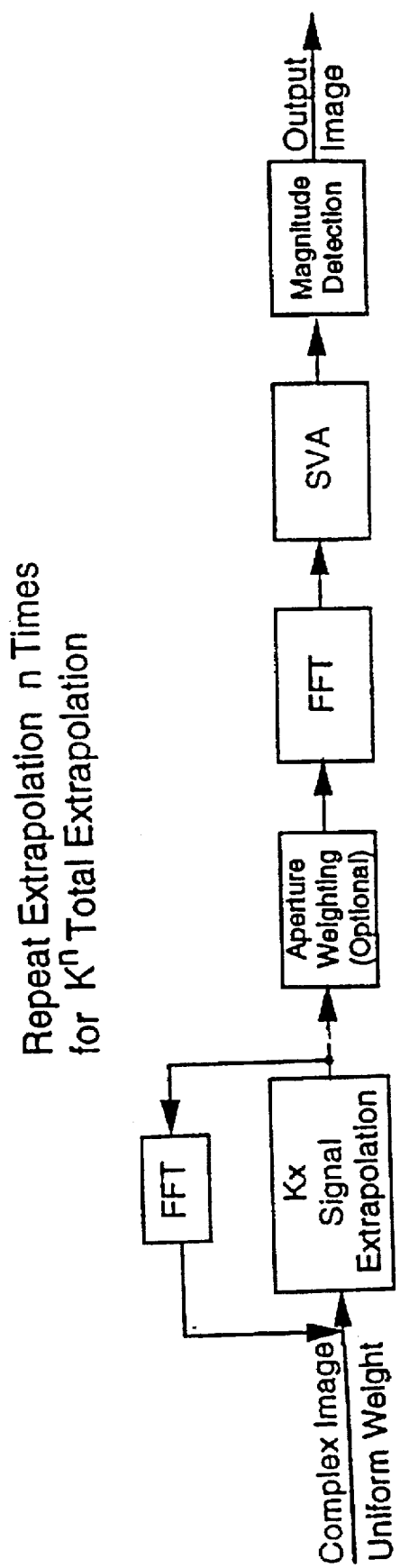
FIG. 6 is a block diagram of a synthetic-aperature radar system employing a Super-SVA super-resolution.
Figure 7:
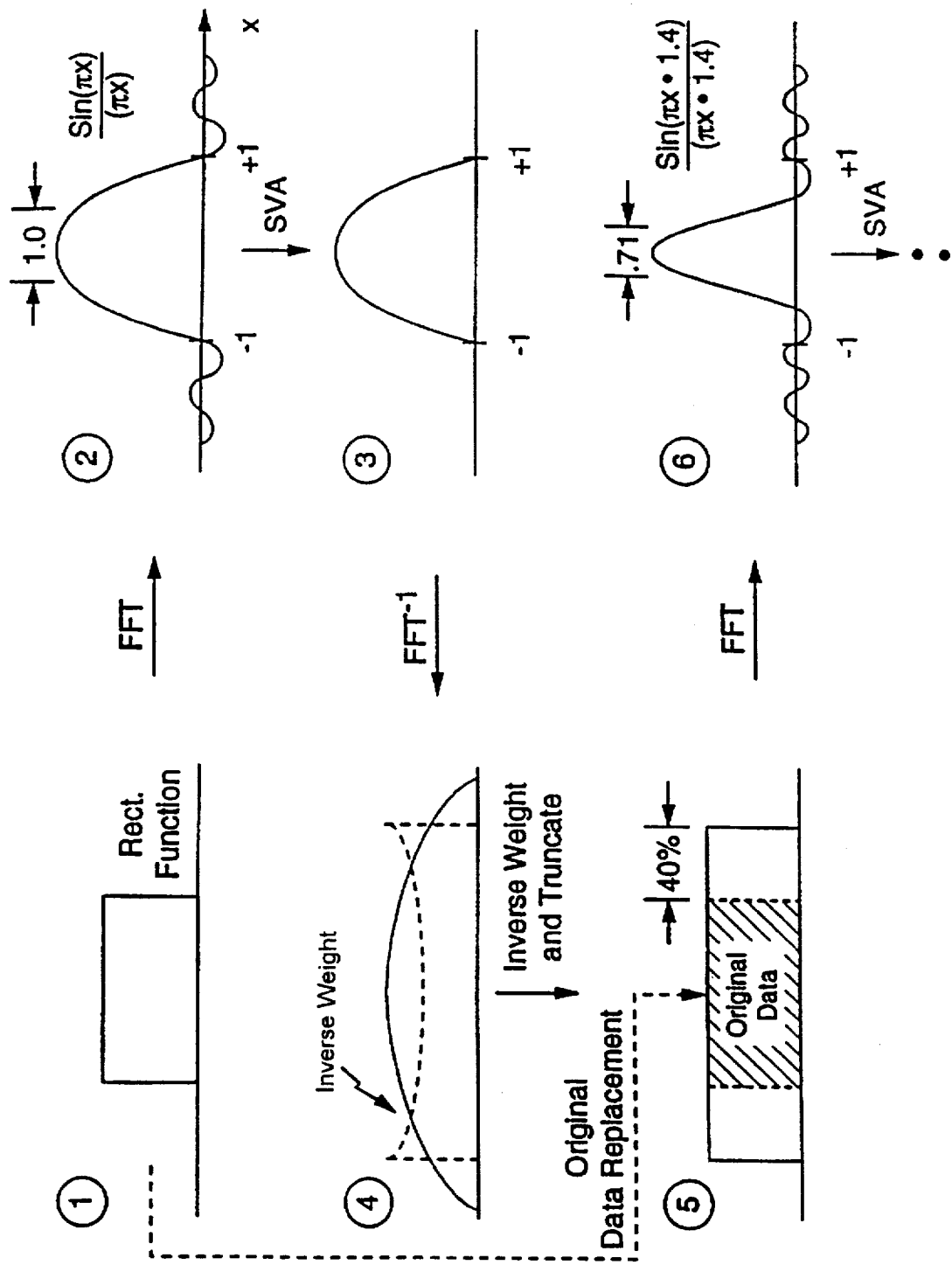
FIG. 7 is a flow chart showing Super-SVA bandwidth extrapolation.

FIG. 6 illustrates the steps in the Super-SVA super resolution algorithm application. The development of Super-SVA begins with a complex, uniformly weighted SAR/ISAR signal represented by the rectangle function in Step 1 of FIG. 7. The signal is treated as the superposition of complex sinusoids representing the combined return signal contributions from the scatterers in the scene. A one-dimensional representation is used for clarity with extension to two-dimensional signals proceeding in a straightforward manner.

After performing an FFT, SVA is applied to the resultant image to remove the sidelobes (Steps 2 and 3). Since SVA is a nonlinear operation, the image is no longer band-limited at this point.

The inverse FFT of the SVA'd image has greater extent in the frequency domain than the original band-limited signal, as illustrated in Step 4. The fundamental, underlying assumption of the Super-SVA algorithm is that application of SVA changes the image impulse response from one which is band-limited, i.e., a sinc function, to one which is not, i.e., a sinc function mainlobe. Super-resolution results from deconvolving the SVA'd image under the assumption of a sinc mainlobe impulse response, a process called Super-SVA.

The next step in the deconvolution process is to apply an inverse weight in the signal domain as illustrated in Steps 4 and 5. The inverse weight under the above assumptions is, therefore, the inverse of the Fourier transform of the mainlobe of a sinc function. The inverse weighted signal is truncated to keep the total extrapolation less than 60% of the original signal to avoid singularities in the inverse function.

After inverse weighting and truncation of the extrapolated signal, the original signal is used to replace the center portion of the extrapolated signal. Then, SVA is applied to an image formed from this modified extrapolated signal, as indicated in Step 6. The new SVA'd image is then Fourier transformed to the signal domain where inverse weighting and truncation is once again performed in a manner identical to the first iteration of this process.

Figure 8:
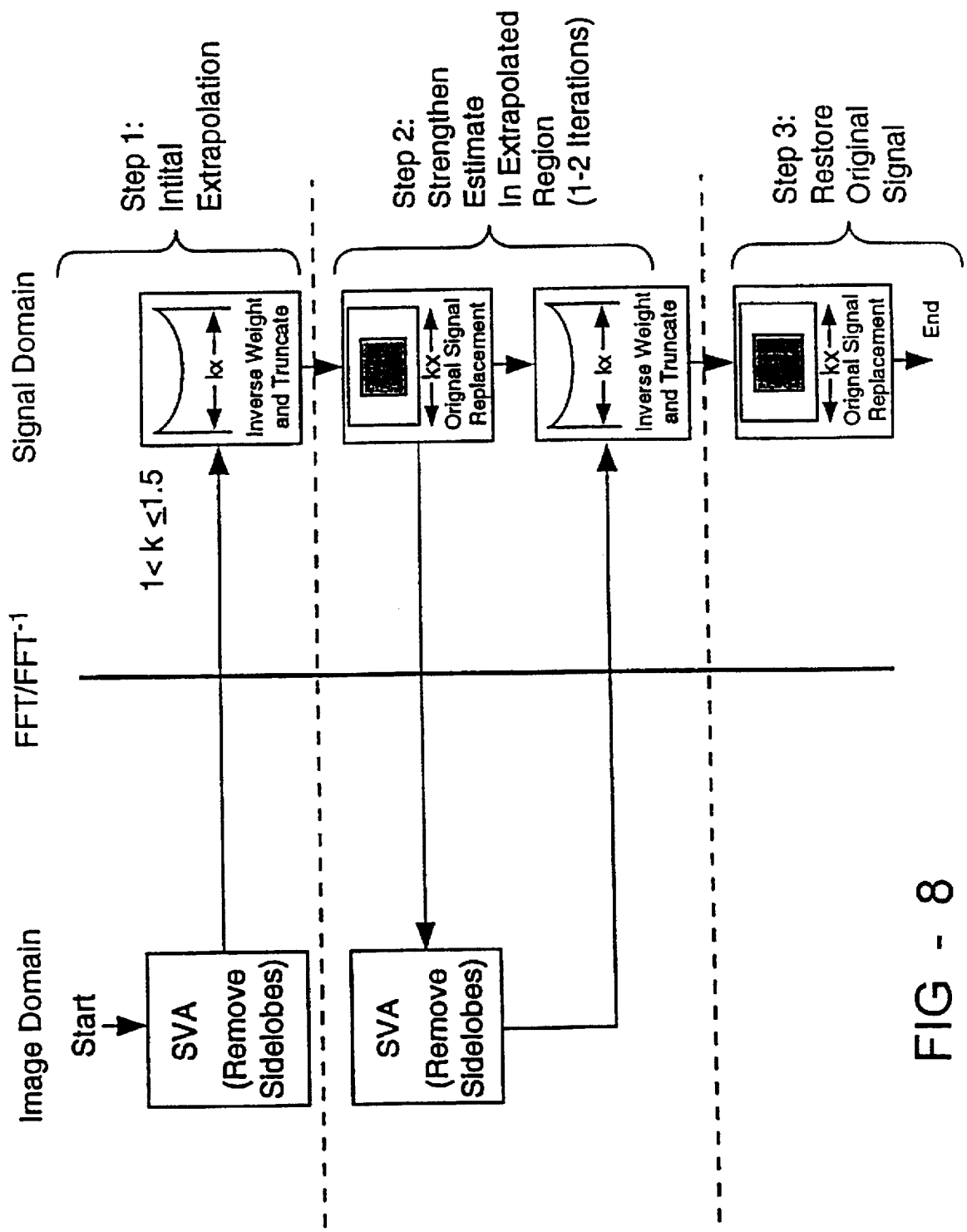
FIG. 8 is a flow chart showing the application of the Signal Extrapolation algorithm.

As indicated in FIG. 6, the extrapolation procedure can be repeated n times, extrapolating each time by a factor k for a total extrapolation factor $K=k^n$. For example, a total K=2 factor extrapolation can be accomplished by n=2 extrapolations where $k=\sqrt{2}$. Step 2 of FIG. 8 shows that the original data replacement step may be performed more than once per extrapolation to improve the quality of the extrapolated data.

Figures 9, 10:
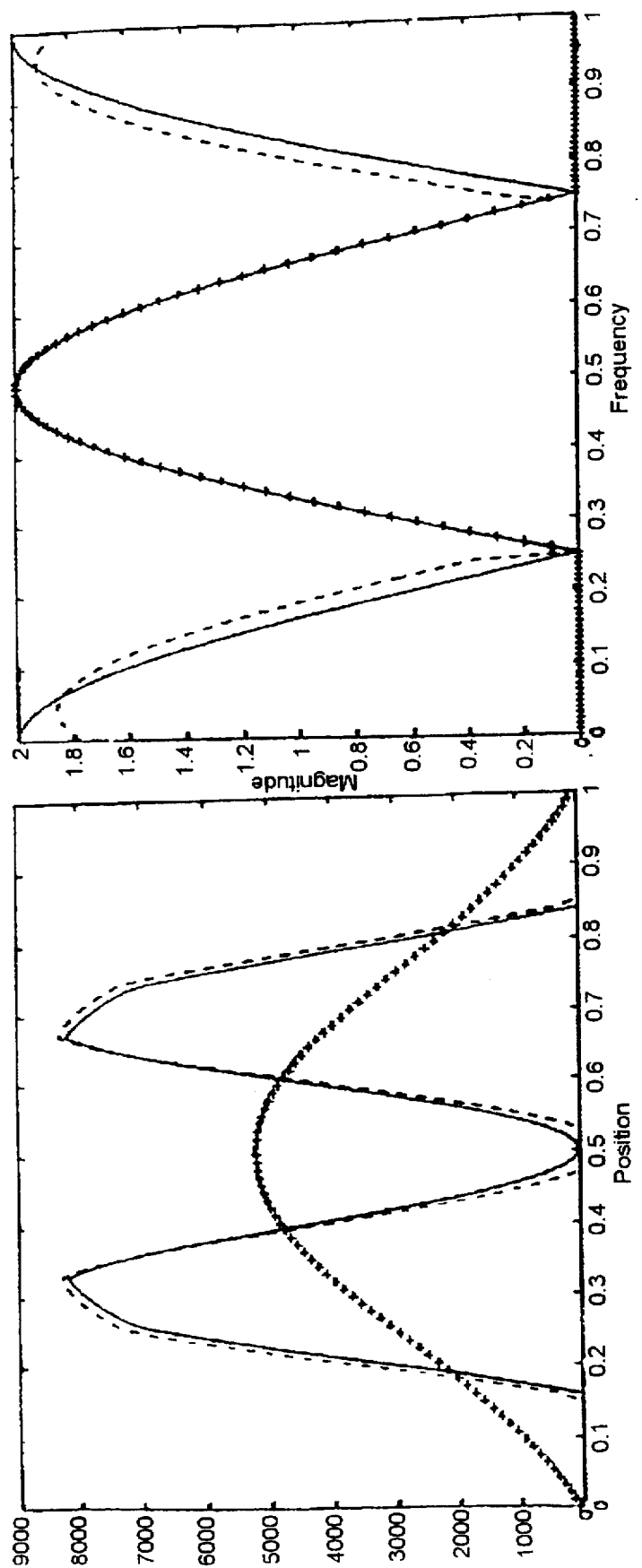
FIG. 9 is a graph illustrating the Image Domain Response of Two Points using Super-SVA.
FIG. 10 is a graph illustrating the Signal Domain Response of Two Points using Super-SVA.

FIGS. 9 and 10 demonstrate that Super-SVA can be used to achieve resolution of closely spaced point targets beyond the limits of diffraction. FIG. 9 shows the results of Super-SVA applied to two (2) synthetic point targets spaced I Nyquist sample apart. This figure compares the image domain response of the original bandwidth image, the Super-SVA image, and an image with twice the bandwidth of the original. The Super-SVA process used two extrapolations of each of $\sqrt{2}$ to achieve an overall bandwidth extrapolation factor of 2. After the second extrapolation, the original signal data was embedded in the extrapolated signal and eight (8) iterations of the Super-SVA process with no further extrapolation were performed. Only two (2) iterations are needed to super-resolve the points; the additional iterations without extrapolation were used to improve the fidelity of the extrapolated data. FIG. 10 shows a comparison of the original, Super-SVA, and twice bandwidth signal domain responses of the two point targets. The Super-SVA response is very close to that which would be obtained Using twice the original signal bandwidth. The extrapolation is not exact because Super-SVA is an image domain technique, and therefore susceptible to artifacts introduced by the discrete Fourier transform namely, "picket-fence" and "leakage" effects, these effects being discussed in "On the Use of Windows for Harmonic Analysis With the Discrete Fourier Transform," Proceedings of the IEEE, Vol. 66, No. 1, January 1978. Leakage is effectively minimized with SVA. The picket fence effects can be mitigated with higher amounts of upsampling in the original data. In this example, upsampling by 16 was used.

A more challenging super resolution example is shown in FIGS. 11A–F. The image consists of 36 equal amplitude points with random phases. The points were placed so as to be prone to "picket-fence" effects. Spacing between points occurs in multiples of 0.96 Nyquist samples with 0.96 Nyquist samples being the closest spaced points. White noise was added to the original signal data to obtain a 33 dB image domain signal-to-noise ratio.

Figure 11A:
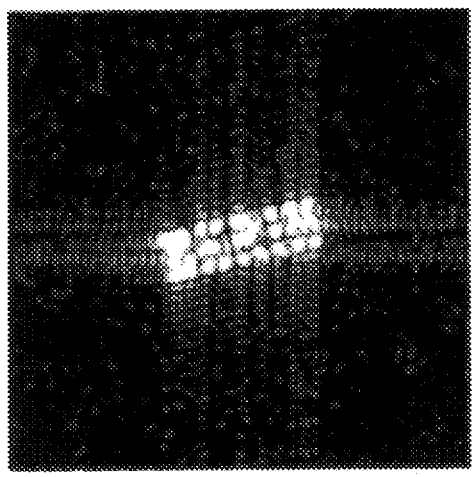
FIGS. 11A through 11F are photographs illustrating a comparison of images derived from various signal processing methods.
Figure 11B:
Figure 11C:
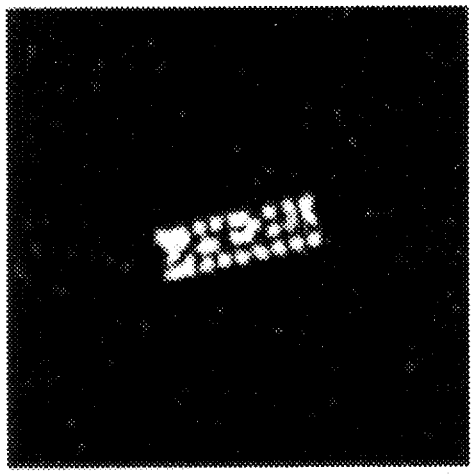
Figure 11D:
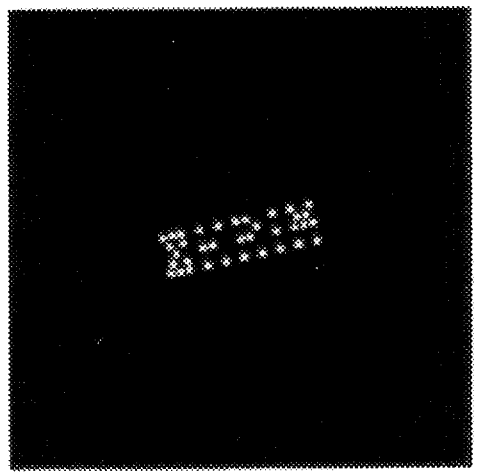
Figure 11E:
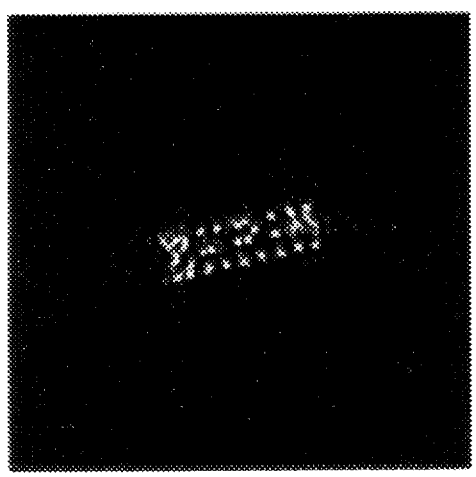
Figure 11F:
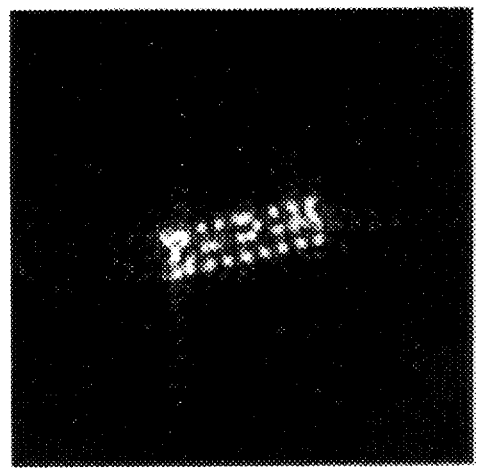

FIGS. 11A–F compare the images made from the original uniformly weighted signal with SVA, Taylor weighting, and Super-SVA. Also shown for comparison is an image made from a noiseless signal of twice the original bandwidth in each direction. Uniform weighted, −30 dB Taylor weighted, and SVA 2D uncoupled IIQ (described in "Nonlinear Apodization for Sidelobe Control in SAR Imagery," IEEE Transactions on Aerospace and Electronic Systems, Vol. 31, No. 1, January 1995) processings of the noise-corrupted original signal are shown in FIGS. 11A, 11B, and 11C, respectively. An SVA image based on a noiseless signal with twice the bandwidth in each direction is shown in FIG. 11D. The Super-SVA results using SVA 2D uncoupled IIQ to extrapolate in 2 dimensions simultaneously are shown in FIGS. 11E and 11F. Two extrapolations of $\sqrt{2}$ were used to super-resolve by a factor of two (2) in each direction. The Super-SVA process used 4× over sampling and eight (8) final iterations of data replacement with no extrapolation. Overall, the Super-SVA process provides an improvement in resolution over the original image, but does not quite achieve the clean target separation of the noise-free twice bandwidth image.

What is claimed is:

1. A method of super-resolving a signal, comprising the steps of:
   a) receiving an original, information-carrying signal;
   b) performing a numerical transformation on the signal, resulting in a signal having a main lobe and sidelobes;
   c) reducing the sidelobes;
   d) performing an inverse of the numerical transformation on the sidelobe-reduced signal;
   e) applying an inverse weighting and truncation to the signal obtained in step d);
   f) replacing the center portion of the signal obtained in step e) with the original signal; and
   g) repeating steps b) through f).

2. The method of claim 1, wherein the information-carrying signal is representative of a synthetic aperture radar (SAR) image.

3. The method of claim 1, wherein the information-carrying signal is represented by a rectangular function.

4. The method of claim 1, wherein the numerical transformation is a fast Fourier transform (FFT).

5. The method of claim 1, wherein the step of reducing the sidelobes includes eliminating the sidelobes.

6. The method of claim 1, wherein the step of reducing the sidelobes includes the use of adopization.

7. The method of claim 1, wherein the inverse weighting is obtained by performing the inverse numerical transformation on the main lobe.

8. The method of claim 1, wherein, in step e), the inverse weighted signal is truncated in accordance with a percentage of the information-carrying signal to avoid singularities therein.

9. The method of claim 8, wherein the percentage is approximately 60%.

10. The method of claim 1, wherein step g) is repeated a plurality of times.

11. A method of resolving a compressed signal beyond the limits of diffraction, comprising the steps of:

receiving an input signal in the image domain; and extrapolating the signal two or more times, each extrapolation including the steps of:

sidelobe reduction, transformation into the signal domain, inverse weighting and truncation, replacement of the central portion of the truncated signal with the input signal, and transformation back into the image domain.

12. The method of claim 11, wherein the original signal is representative of a synthetic aperture radar (SAR) image.

13. The method of claim 11, wherein the numerical transformation includes a fast Fourier transformation (FFT).

14. The method of claim 11, wherein the step of reducing the sidelobes includes eliminating the sidelobes.

15. The method of claim 11, wherein the step of reducing the sidelobes includes apodization.

16. The method of claim 11, wherein the truncation is performed in accordance with a percentage of the input signal to avoid singularities therein.

17. The method of claim 1, wherein n extrapolations are performed, for a total extrapolation factor of $K=k^n$, where $k=\sqrt{n}$.

18. Super spatially variant apodization, comprising the steps of:

receiving a synthetic aperture radar (SAR) signal in the form of a rectangular function; and extrapolating the signal two or more times, each extrapolation including the steps of:
fast Fourier transformation, resulting in a sinc function having a main lobe and sidelobes,
sidelobe reduction through apodization,
inverse fast Fourier transformation,
inverse weighting of the main lobe;
truncation of the inverse weighted signal using a percentage of the received signal,
replacement of the central portion of the truncated signal with the rectangular function, and
inverse fast Fourier transformation.

19. The method of claim 18, wherein the SAR signal is an inverse SAR signal.

20. The method of claim 18, wherein the SAR signal is multidimensional.

21. The method of claim 18, wherein n extrapolations are performed, for a total extrapolation factor of $K=k^n$, where $k=\sqrt{n}$.

* * * * *